(12) United States Patent
Venkatraman

(10) Patent No.: US 6,775,747 B2
(45) Date of Patent: Aug. 10, 2004

(54) SYSTEM AND METHOD FOR PERFORMING PAGE TABLE WALKS ON SPECULATIVE SOFTWARE PREFETCH OPERATIONS

(75) Inventor: KS Venkatraman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 10/037,665

(22) Filed: Jan. 3, 2002

(65) Prior Publication Data
US 2003/0126371 A1 Jul. 3, 2003

(51) Int. Cl.[7] ............................................... G06F 12/00
(52) U.S. Cl. .................... 711/137; 711/163; 711/169; 711/204
(58) Field of Search ............................... 711/152, 163, 711/169, 204, 205, 137

(56) References Cited

U.S. PATENT DOCUMENTS 5,564,111 A 10/1996 Glew et al.
5,680,565 A 10/1997 Glew et al.
5,956,753 A 9/1999 Glew et al.

OTHER PUBLICATIONS

U.S. patent application Ser. No. 09/053,383, Palanca, et al., filed Mar. 31, 1998.

Primary Examiner—Jack A. Lane
(74) Attorney, Agent, or Firm—Blakely, Sokoloff, Taylor & Zafman LLP

(57) ABSTRACT

A method and system are employed within a processor for performing page table walks on speculative software prefetch operations. The system includes a first fault register to store information associated with a faulting micro-op relating to a non-prefetch memory access operation and a second fault register to store information associated with a faulting micro-op relating to a prefetch memory access operation. Also included in the system is a first unit to determine whether a currently pending micro-op relates to a non-prefetch operation or a prefetch operation. The first unit is configured to drop the currently pending micro-op from a pipeline if (1) the currently pending micro-op relates to a prefetch memory access and (2) the currently pending micro-op has previously faulted.

21 Claims, 3 Drawing Sheets

SYSTEM AND METHOD FOR PERFORMING PAGE TABLE WALKS ON SPECULATIVE SOFTWARE PREFETCH OPERATIONS

BACKGROUND

1. Field of the Invention

The present invention generally relates to computer systems, and in particular, to handling of memory access operations.

2. Description of the Related Art

To facilitate memory access operations, a translation-lookaside buffer (TLB) is employed by microprocessors to provide the translation of linear addresses to physical addresses. The TLB caches linear addresses and corresponding physical addresses. In use, the TLB is initially accessed to determine whether the TLB contains the physical address corresponding to a linear address identifying a desired memory location. If the linear address is found within the TLB, a "hit" is said to have occurred, and the physical address is merely loaded out of the TLB. If the linear and physical addresses are not cached within the TLB, then a TLB "miss" is said to have occurred. In which case, a page miss handler (PMH) is used to perform a page table walk to determine the physical address corresponding to the desired linear address.

At least in some of the existing microprocessors, if a TLB "miss" occurs on a prefetch, the prefetch operation causing the TLB "miss" is automatically dropped from the execution pipeline because of difficulties and complexities associated with managing faults in connection with speculative memory access operations. Consequently, when a TLB "miss" is detected on a prefetch operation, the prefetch operation is aborted from the system and corresponding page table walk is not performed.

Faults represent circumstances where normal processing of the memory access to physical address cannot be properly processed. A wide variety of faults are commonly known. Examples include page and protection faults. In a page fault, the physical address identifies a page not presently held in the main memory, which must be read from the hard disk. A protection fault indicates that the physical address identifies a portion of memory for which the currently executing process does not have the privilege to access because, for example, the current process is a user program and the memory identified by the physical address corresponds to operating system ("OS") memory.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION

In the following description, specific details are set forth in order to provide a thorough understanding of the present invention. However, it will be apparent to one skilled in the art that the present invention may be practiced without these specific details. In other instances, well-known circuits, structures and techniques have not been shown in detail in order to avoid obscuring the present invention.

Figure 1:
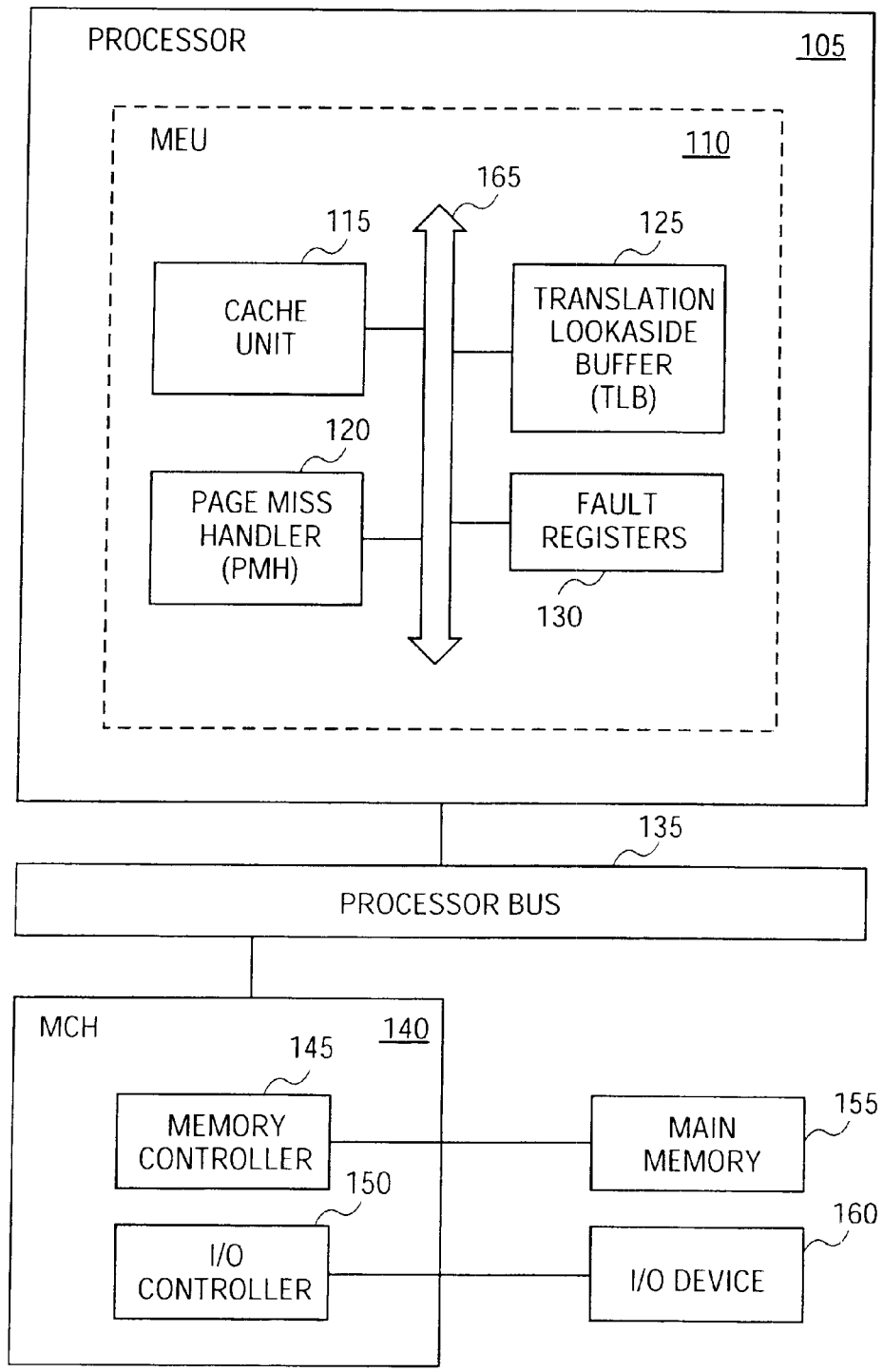
FIG. 1 shows a block diagram of an embodiment of a computer system employing the present invention.

FIG. 1 depicts an embodiment of a computer system employing the present invention. The computer system includes a processor 105 coupled to a processor bus 135. In one embodiment, the processor 105 is a processor from the Pentium® family of processors available from Intel Corporation of Santa Clara, Calif. However, the processor 105 may be of any other type, such as a complex instruction set computer ("CISC"), reduced instruction set computer ("RISC"), very long instruction word ("VLIW"), or hybrid architecture. In one embodiment, the processor 105 is an out-of-order processor capable of performing operation either out-of-order or speculatively. However, the present invention may operate with any type of processor (e.g., out-of order, in-order, etc.).

Also coupled to the processor bus 135 is a memory controller hub (MCH) 140. The MCH 140 includes a memory controller 145 and an I/O controller 150. In the illustrated embodiment, a main memory 155 is coupled to the processor bus 135 through the MCH 140. The processor 105 generates instructions (also referred to herein as micro-operations or "micro-ops") such as memory loads, stores and prefetches. The micro-ops are, in general, in a sequence which may differ from the sequence in which the instructions appear within a computer program. Micro-ops which involve memory accesses such as memory loads, stores and prefetches are executed by a memory execution unit (MEU) 110.

The MEU 110 includes, among other things, a cache unit 115, a page-miss handler (PMH) 120, a translation-lookaside buffer (TLB) 125 and a fault register 130 coupled through a central processing unit (CPU) bus 165. The cache unit may comprise a first level (L0) cache memory and a second level (L1) cache memory. The L0 and L1 cache memories can be integrated into a single device. Alternatively, the L1 cache memory may be coupled to the processor by a shared bus.

The main memory 155 and the cache unit 115 store sequences of instructions and data that are executed by the processor 105. In one embodiment, the main memory 155 includes a dynamic random access memory (DRAM); however, the main memory may have other configurations. Additional device may also be coupled to the memory controller hub 140, such as multiple main memory devices. The memory controller 145 coordinates data transfer to and from the main memory at the request of the processor 105 and/or I/O devices 160. Data and/or sequences of instructions executed by the processor 105 may be retrieved from the main memory 155, the cache memories 115 or other storage devices. The computer system is described in terms of a single processor; however, multiple processors can be coupled to the processor bus.

In operation, TLB 125 maintains a mapping of address translations between linear addresses and corresponding physical addresses. When a memory-access type micro-op is loaded in an execution pipeline, it is intercepted by TLB 125 which performs a lookup to determine whether its internal cache lines contain the physical address corresponding to the linear address of the micro-op. If the address translation is found therein, i.e., if a hit occurs, TLB 125 re-dispatches the micro-op, updated to include the physical address. If a miss occurs, TLB 125 notifies the PMH 120 that a page table walk must be performed to determine the physical address corresponding to the linear address of the micro-op.

When PMH 120 performs a page table walk to determine the corresponding physical address, a fault may be detected. When a fault is detected, operating system needs to know which instruction caused the fault so that it can invoke an appropriate interrupt routine to process the faulting instruction. And the fault registers are used to communicate faulting micro-op to the operating system. Accordingly, if a fault is detected by the PHM 120, information identifying the faulting micro-op and the linear address corresponding thereto is stored in one of the fault registers 130. In one embodiment, if the processor is configured to execute multiple threads simultaneously, multiple fault registers are used to handling faulting micro-op on per thread basis.

According to one embodiment, if the micro-op causing a fault is a non-speculative micro-op (e.g., load, store), the information relating to the fault is stored in a first set of fault registers (also referred to herein as "non-prefetch fault register") for handling non-speculative memory access operations. On the other hand, if the micro-op causing a fault is a speculative micro-op (e.g., prefetch), the information identifying the faulting micro-op (e.g., its sequence number) is stored in a second set of fault registers (also referred to herein as "prefetch fault register") for handling speculative memory access operations. The prefetch fault registers and the method by which prefetch faults are processed will be described in greater detail below.

Figure 2:
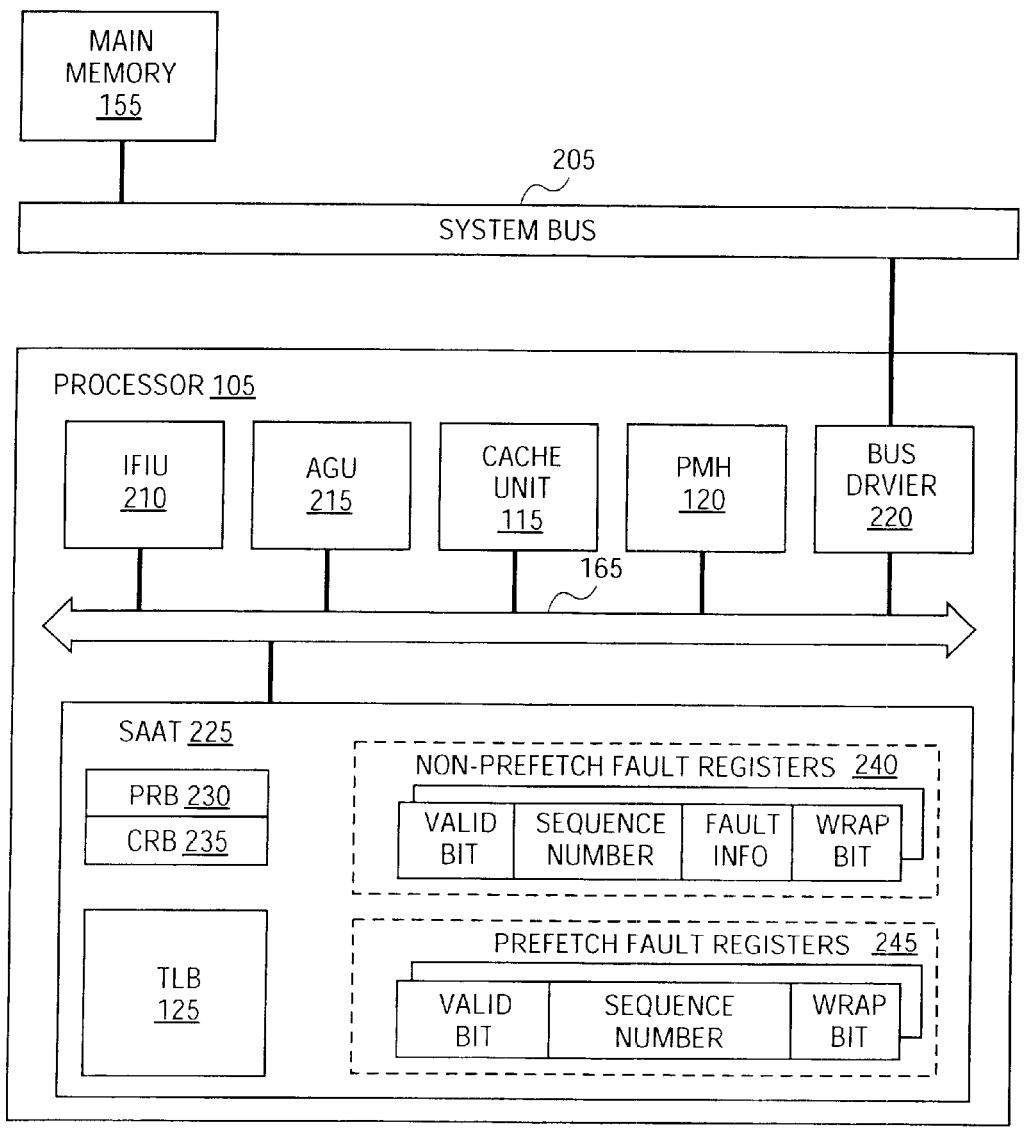
FIG. 2 shows a block diagram of portions of a processor implementing a non-prefetch and prefetch fault register arrangement according to one embodiment of the invention.

FIG. 2 depicts portions of the processor 105 implementing a non-prefetch and prefetch fault register arrangement according to one embodiment of the invention. The processor 105 includes a segmentation and address translation (SAAT) unit 225 which is connected through a central processing unit (CPU) bus 165 to an instruction fetch and issue unit (IFIU) 210, and address generation unit (AGU) 215, a page miss handler (PMH) 120, a cache unit 115 and a system bus driver 220. The bus driver 220 is also connected through a system bus 205 to a main memory 155. Numerous other functional elements of the processor 105 are, for clarity and brevity, not illustrated within FIG. 2. Rather, FIG. 2 merely illustrates a limited number of functional components sufficient to describe the operation of the SAAT 225 in connection with PMH 120 and other components.

The SAAT 225 includes, among other things, a TLB 125, a pending request buffer (PRB) 230 and a current request buffer (CRB) 235. The PRB/CRB contains a number of entries and is used to buffer TLB misses. Because the PMH take a number clock cycles to perform page table walk and is not able to process a TLB miss every cycle, the PRB/CRB is used to store previous TLB misses that have not been processed by the PMH. Each entry in the PRB/CRB includes a linear address, a sequence number and a prefetch bit indicating whether the corresponding micro-op is a prefetch operation.

When the SAAT 225 intercepts a micro-op, it looks up the linear address associated with the instruction in the TLB 125. If a TLB miss occurs, the information relating to the TLB miss such as the linear address, the sequence number and a prefetch indicator is stored in PRB 230. During subsequent cycles, each entry in the PRB 230 moves its way up the queue into the CRB 235. When the TLB miss reaches the CRB 235, the PMH 120 is invoked to perform page table walk associated with the TLB miss by accessing the main memory and returning corresponding physical address to the TLB. By doing so, when the prefetch instruction is replayed during subsequent cycles, a TLB hit will occur if the page table walk is successfully performed by the PMH.

However, if a fault is detected while performing the page table walk, the PMH 120 sends a fault signal to the SAAT 225 indicating that a fault has occurred. In one embodiment, the SAAT 225 includes a mechanism for separately handling faulting prefetch micro-ops and faulting non-prefetch micro-ops. This is achieved by incorporated in the SAAT 225 is at least one non-prefetch fault register 240 and at least one prefetch fault register 245. By doing so, the SAAT 225 is able to separate faulting information relating to prefetch micro-ops from other types of memory access operations such as loads and stores.

In one embodiment, the prefetch fault registers 245 serves to maintain information related to previously faulting prefetch operations so that the previously faulting prefetch operations can be dropped during replay. To achieve this, the illustrated prefetch fault registers are configured to store sequence number information and a valid bit associated with the faulting prefetch micro-op. The prefetch fault registers 245 may be configured to store other information such as a wrap bit to indicate whether a wrap around has occurred in the sequence number.

During page table walk, if a fault is detected, then the SAAT 225 determines if the fault is associated with a prefetch or non-prefetch operation by examining the prefetch bit in the CRB 235. If the prefetch bit is not set, the SAAT 225 updates one of the non-prefetch fault registers 240. If the prefetch bit is set, the SAAT 225 updates one of the prefetch fault registers 245 by storing information relating to the faulting micro-op, including its sequence number and setting the valid bit to one.

As noted above, if a prefetch operation has faulted in the previous cycles, the SAAT 225 is configured to drop the faulting prefetch operation during replay. More specifically, when a micro-op faults, it will replay and re-execute since the micro-op did not complete its operation. Anytime, a prefetch micro-op executes, the SAAT 225 does a prefetch fault register lookup by comparing the sequence number of the pending prefetch micro-op with the sequence number in the prefetch fault registers 245. If the sequence numbers match, a prefetch fault register hit is said to have occurred and the pending prefetch micro-op will be dropped so that it cannot be replayed. At the same time, the entry in the prefetch fault register containing the matching sequence number is cleared by setting the valid bit to zero so that it can be reused during subsequent cycles. If the sequence numbers do not match, the SAAT will try to execute the prefetch in a normal manner by performing TLB lookup, etc. By doing so, the SAAT can effectively determine which prefetch micro-op in the pipeline has previously faulted so that those prefetch micro-ops that have previously faulted can be dropped from execution pipeline.

With respect to faults relating to non-speculative memory access operations, only the oldest fault has to be reported back to the operating system. Typically, each micro-op is assigned a sequence number in a sequential manner to indicate the relative age of each micro-op with respect to other micro-ops loaded in the execution pipeline. To select the oldest faulting micro-op, the SAAT 225 compares the age between the faulting micro-op and the information stored in the non-prefetch fault register for a previous faulting micro-op by comparing the two sequence numbers. In the illustrated embodiment, each non-prefetch fault register is configured to store valid bit, sequence number, fault information and a wrap bit. The faulting information is a string of bits that are encoded to indicate the type of fault.

Figure 3:
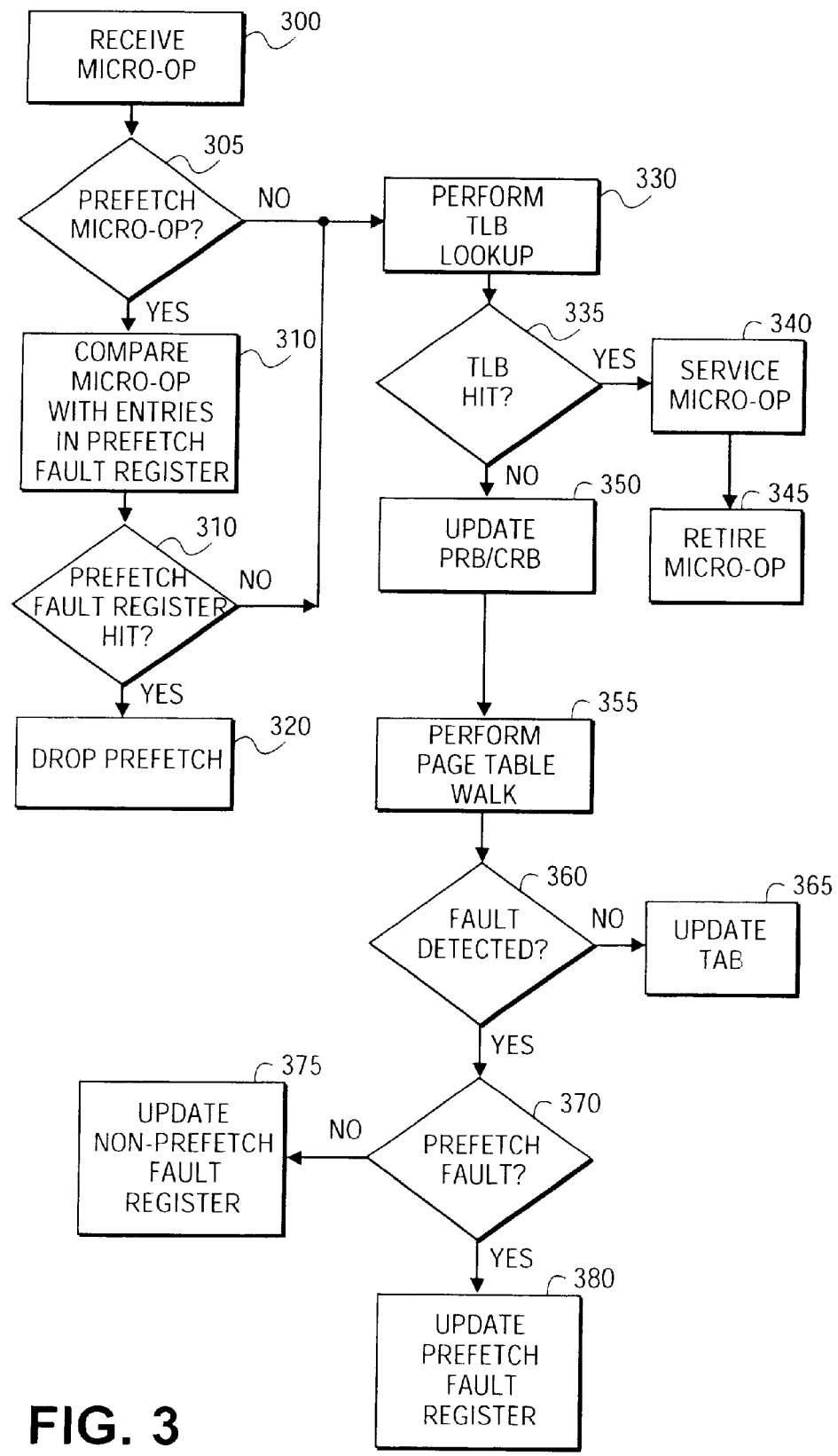
FIG. 3 shows a flowchart of performing page table walks on speculative memory access operations according to one embodiment of the invention.

FIG. 3 depicts a flowchart of performing page table walks on speculative memory access operations according to one embodiment of the invention. Although FIG. 3 illustrates operations in a flowchart form, those skilled in the art will appreciate that each block of the flowchart may also represent a device or circuit within microprocessor for performing the described action. In some cases, the action will be performed by dedicated hardware. In other cases, the action may be performed by micro-code or other types of software.

Initially, a micro-op containing, among other things, information relating to the type of instruction and a sequence number is generated and loaded in a pipeline. Although the processor generates a wide variety of micro-ops, only memory access micro-ops, such as prefetch, load and store, will be considered herein in detail.

In block 300, the micro-op loaded in the pipeline is received by the SAAT. Then, the execution proceeds to block 305 where SAAT determines whether the micro-op relates to speculative or non-speculative type memory access operation. If the micro-op received by the SAAT is non-speculative type memory access operation (e.g., load, store), execution proceeds to block 330 where the TLB attempts to perform a translation of the linear address specified by the micro-op to a corresponding physical address. The translation is attempted by accessing cache lines within the TLB to determine whether the linear address/physical address combination is already contained therein. At block 335, the TLB determines whether the micro-op results in a TLB hit or a TLB miss. At block 335, if a hit occurs, that is, the linear address/physical address combination is contained within the TLB, then execution proceeds to block 340 where the memory access operation specified by the micro-op is serviced and retired in block 345.

At block 335, if a TLB miss occurred, execution proceeds to block 350 where the PRB/CRB is updated. The PRB/CRB is used to buffer TLB misses and includes entries that store, among other things, a prefetch bit which indicates whether the memory access specified by the micro-op is a speculative or a non-speculative type micro-op. Then at block 355, the PMH will access the contents of CRB to perform a page table walk to determine the physical address corresponding to the linear address specified by the CRB.

Once a page table walk has been performed following a TLB miss, execution proceeds to block 360 for determination of whether a fault occurred. If no fault is detected in block 360, execution proceeds to block 365 where the TLB miss is serviced by creating a corresponding mapping for the physical to linear address space. By doing so, when the micro-op causing the TLB miss is replayed during subsequent cycles, the necessary information to perform the linear address translation requested by the micro-op may be provided by the TLB.

If a fault is detected at block 360, execution proceeds to block 370 where the SAAT determines the type of operation requested by the faulting micro-op. In one embodiment, the SAAT determines if the faulting micro-op is a prefetch request by examining the corresponding entry in the CRB to determine if the prefetch bit is set. If the prefetch bit is set to indicate that the memory access operation requested by the faulting micro-op is a prefetch, then execution proceeds to block 380 where the SAAT stores information identifying (e.g., sequence number) the faulting micro-op into the prefetch fault register. Otherwise, if the prefetch bit is not set, the memory access operation requested by the faulting micro-op is a non-speculative type and the execution proceeds to block 375 where the SAAT stores information identifying the faulting micro-op into the non-prefetch fault register. In one embodiment, the SAAT is configured to store information relating to the faulting non-prefetch type micro-op if the non-prefetch fault register is empty or otherwise contains invalid data or if the new faulting micro-op is older than the previous faulting micro-op.

By updating the faulting prefetch micro-op in a separate prefetch fault register, the SAAT is capable of suppressing subsequent replay of the faulting prefetch micro-op. More specifically, during subsequent cycles, when the faulting prefetch micro-op is replayed, execution will proceed to block 310 where the SAAT determines if the current prefetch micro-op has previously faulted by examining the entries in the prefetch fault register. In one embodiment, to determine if the current prefetch micro-op has previously faulted, the SAAT compares the sequence number of the current prefetch micro-op with the sequence number(s) stored in the prefetch fault register. Then, at block 315, the SAAT determines whether a prefetch fault register "hit" or a "miss" has occurred based on the sequence number comparison. If the sequence numbers match, a prefetch fault register hit is detected which indicates that the current prefetch micro-op has previously faulted and is dropped from the execution pipeline in block 320.

According to one embodiment, the SAAT attempts to service prefetch instructions even if it caused a TLB miss by performing page table walk. In this regard, if the micro-op received by the SAAT relates to a prefetch operation (block 305, NO), execution proceeds to block 310 where the SAAT determines if the current prefetch micro-op has previously faulted. And if the current micro-op has not previously faulted, execution proceeds to block 330 where the TLB attempts to perform a translation of the linear address specified by the current prefetch micro-op. Hence, a TLB lookup is performed both in response non-prefetch type micro-ops and in response prefetch type micro-ops following a prefetch fault register miss. Accordingly, the SAAT performs a page table walk on speculative memory access operations following a TLB miss.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
   a non-prefetch fault register to store information associated with a faulting micro-operation relating to a non-prefetch memory access operation;
   a prefetch fault register to store information associated with a faulting micro-operation relating to a prefetch memory access operation, wherein the prefetch fault register is separate from the non-prefetch fault register; and
   a first unit to determine whether a currently pending micro-operation (micro-op) relates to a non-prefetch operation or a prefetch operation, wherein if the currently pending micro-op is a prefetch memory access, the first unit determines if the currently pending micro-op has previously faulted based on information contained in the prefetch fault register, wherein said first unit drops said currently pending micro-op from a pipeline if (1) said currently pending micro-op relates to a prefetch memory access and (2) said currently pending micro-op has previously faulted.

2. The system of claim 1, wherein said micro-op includes information relating to the type of instruction and a sequence number.

3. The system of claim 2, wherein said first unit compares the sequence number of a currently pending micro-op with sequence number stored in the prefetch fault register if the currently pending micro-op relates to a prefetch memory access operation.

4. The system of claim 3, wherein said first unit drops the currently pending micro-op from the pipeline if the sequence number of the currently pending micro-op matches with the sequence number stored in the prefetch fault register.

5. The system of claim 3, wherein said first unit performs a TLB lookup on the currently pending micro-op if the sequence number of the currently pending micro-op does not match with the sequence number stored in the prefetch fault register, and performs page table walk on the currently pending micro-op if a TLB miss occurs.

6. The system of claim 1, wherein said prefetch fault register is used to store information associated with only a prefetch-type memory access operation.

7. A method comprising:
    determining whether a linear address specified by a micro-operation (micro-op) is contained within a translation-lookaside buffer (TLB);
    performing page table walk if a TLB miss occurs;
    determining whether a fault has occurred;
    if a fault is detected, then
    determining whether the faulting micro-op relates to a non-prefetch memory access operation or a prefetch memory access operation,
    updating a non-prefetch fault register if the faulting micro-op relates to a non-prefetch memory access operation,
    updating a prefetch fault register if the faulting micro-op relates to a prefetch memory access operation;
    determining if a currently pending micro-op is a prefetch memory access; and
    if the currently pending micro-op is a prefetch memory access, determining if the currently pending micro-op has previously faulted based on information contained in the prefetch fault register.

8. The method of claims 7, further comprising:
    dropping said currently pending micro-op from a pipeline if (1) said currently pending micro-op relates to a prefetch memory access and (2) said currently pending micro-op has previously faulted.

9. The method of claim 7, wherein said micro-op includes information relating to the type of instruction and a sequence number.

10. The method of claim 9, further comprising comparing the sequence number of a currently pending micro-op with sequence number stored in a prefetch fault register if the currently pending micro-op relates to a prefetch memory access operation.

11. The method of claim 10, further comprising dropping the currently pending micro-op from the pipeline if the sequence number of the currently pending micro-op matches with the sequence number stored in the prefetch fault register.

12. The method of claim 10, further comprising:
    performing a TLB lookup on the currently pending micro-op if the sequence number of the currently pending micro-op does not match with the sequence number stored in the prefetch fault register; and
    performing page table walk on the currently pending micro-op if a TLB miss occurs.

13. The method of claim 7, wherein said prefetch fault register is used to store information associated with only a prefetch-type memory access operation and at least one register to store information associated with a faulting speculative non-prefetch memory access operation.

14. A processor comprising:
    a translation-lookaside buffer (TLB) to perform linear address translation operation associated with a linear address specified by a micro-operation (micro-op);
    a page miss handler to perform page table walk in response to a TLB miss;
    a non-prefetch fault register to store information associated with a faulting micro-op relating to a non-prefetch memory access operation; and
    a prefetch fault register to store information associated with a faulting micro-op relating to a prefetch memory access operation,
    wherein if a currently pending micro-op is a prefetch memory access, the processor determines if the currently pending micro-op has previously faulted based on information contained in the prefetch fault register.

15. The processor of claim 14, wherein said currently pending micro-op is dropped from a pipeline if (1) said currently pending micro-op relates to a prefetch memory access and (2) said currently pending micro-op has previously faulted.

16. The processor of claim 14, wherein the prefetch fault register is separate from the non-prefetch fault register.

17. The processor of claim 14, wherein said micro-op includes information relating to the type of instruction and a sequence number.

18. The processor of claim 19, wherein said first unit compares the sequence number of a currently pending micro-op with sequence number stored in a prefetch fault register if the currently pending micro-op relates to a prefetch memory access operation.

19. The processor of claim 18, wherein said first unit drops the currently pending micro-op from the pipeline if the sequence number of the currently pending micro-op matches with the sequence number stored in the prefetch fault register.

20. The processor of claim 18, wherein said first unit performs a TLB lookup on the currently pending micro-op if the sequence number of the currently pending micro-op does not match with the sequence number stored in the prefetch fault register, and to perform page table walk on the currently pending micro-op if a TLB miss occurs.

21. The processor of claim 14, wherein said non-prefetch fault register is used to store information associated with only a prefetch-type memory access operation.

* * * * *